P. BLACK.
POTATO DIGGER.
APPLICATION FILED DEC. 11, 1917.
1,279,502.
Patented Sept. 24, 1918.
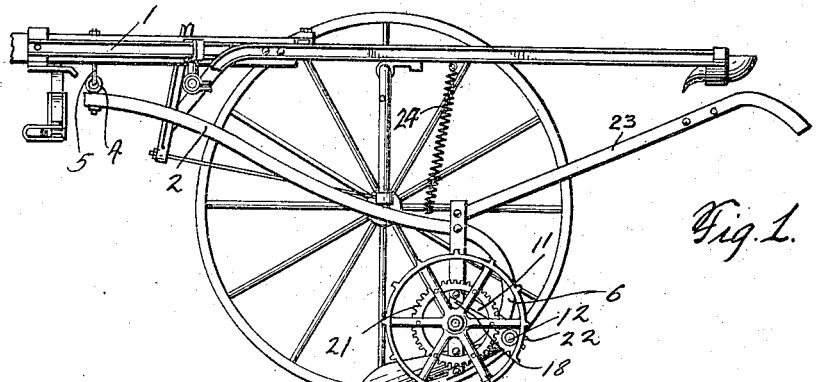
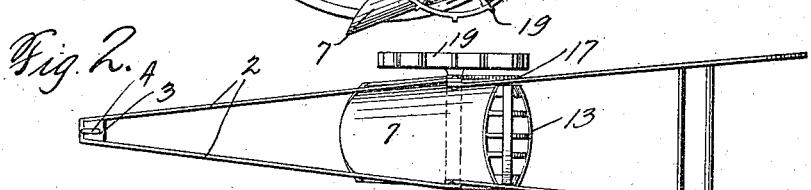
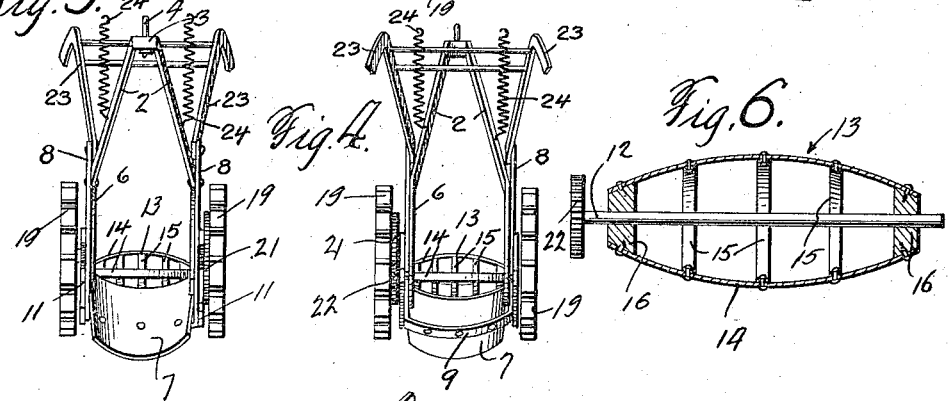
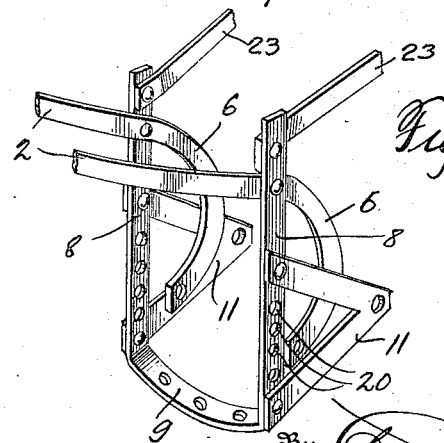
Inventor
P. Black

UNITED STATES PATENT OFFICE.

PAUL BLACK, OF ALGONA, IOWA.

POTATO-DIGGER.

1,279,502.   Specification of Letters Patent.   Patented Sept. 24, 1918.

Application filed December 11, 1917. Serial No. 206,661.

*To all whom it may concern:*

Be it known that I, PAUL BLACK, a citizen of the United States, residing at Algona, in the county of Kossuth, State of Iowa, have invented certain new and useful Improvements in Potato-Diggers; and I do hereby declare the following to be a full, clear, and exact description of the invention, such as will enable others skilled in the art to which it appertains to make and use the same.

This invention relates to potato diggers.

The object of the invention is to provide a practical potato digger or harvester in connection with which the running gear of an ordinary cultivator may be employed, thereby, I avoid the necessity of providing a separate running gear and draft means in connection with the potato harvester to thus effect a consequent saving in cost for farming machinery, and in storage space required.

A further object of the invention is to provide a potato digger which will lift the potatoes in an efficient manner, and then spread them upon the ground for delivering.

With the above objects in view, and such others relating to the details of construction, as may hereinafter appear, my invention will now be fully set forth and described, reference being had to the accompanying drawings.

In the drawings:—

Figure 1 is a side elevation showing the device attached to a cultivator running gear, Fig. 2 is a plan view of the machine detached from the running gear, Fig. 3 is a front view, Fig. 4 is a rear view, Fig. 5 is a perspective view showing the frame structure, and Fig. 6 is a sectional view showing a spreader structure.

Referring more particularly to the drawings, 1 indicates a beam or tongue of the cultivator, which is preferably a part of a running gear of a riding cultivator. Adapted to be secured to the forward portion of the tongue 1 is a pair of beams 2 which diverge from a common forward coupling yoke 3, the latter terminating upon its upper side in an eye 4 which is looped through the eye of an eye bolt 5 which is detachably carried by the beam 1. The beams 2, as they diverge, curve downwardly, and at their inner ends are shaped into the downwardly and forwardly curved arms 6.

The arms 6 are bolted or riveted to the rear corner of a trough-like scoop or plow 7 which extends downwardly at an incline and whose forward end is shaped to cut into the potato rows and take up the potatoes therefrom. Bolted to the outer sides of the beams 2, and extending downwardly vertically therefrom are the arms 8 of a U-shaped support 9 which underlies the plow or scoop 7 and is bolted thereto to hold the latter in the proper relation to the beams 2.

Bolted to the arms 8 are the two-armed brackets 11, the brackets 11 extending rearwardly from the arms 8 in triangular relation, so that the rear apexes of the triangles provide bearings for a transverse shaft 12. The transverse shaft 12 carries, between the brackets 11, a roller or drum 13 which consists of a plurality of straps or bars 14 passed across a framing structure 15 and having their ends secured to hub members 16. The framing 15 and the hub 16 form of the drum 13 an ellipsoid, whose periphery fits within the reëntrant curve 17 of the upper end of the scoop or plow 7, the straps 14, by being spaced apart, providing ridges which will take up the potatoes from the upper end of the scoop 7, and throw them upon the ground, the ellipsoidal form of the drums 13 tending to scatter the potatoes to each side of the rear of the machine so that they are evenly distributed for drying purposes.

Also secured to the sides of the bars 8 are the hub brackets 18 upon whose spindles are supported the wheels 19. Said wheels 19 are ground wheels which support the potato digger, and are adjustably mounted upon the arms 8 for vertical adjustment of the plow structure with relation to the row, by means of the selective series of openings 20.

Secured to the inner side of one of the wheels 19 is a gear wheel 21 which stands in mesh with a comparatively small gear wheel 22 mounted upon the corresponding end of the shaft 12.

In order to direct the movement of the plow 7 into the soil of the row, a pair of handles 23 is extended rearwardly from the sides of the frame structure, to which they are rigidly connected, and as a further support for the beams 2, the springs 24 are extended from the beam 1 to the beams 2 at a suitable rearward point substantially above the forward end of the plow 7.

The manner of use of the machine which has been described will be apparent from the foregoing disclosure, but it should be particularly noted that the device answers the need of a potato digging machine without the necessity of procuring a complete horse drawn running gear structure, since, by the removal of the shovels and shovel beams from an ordinary cultivator frame, and the substitution of the device which has been described, one is enabled to secure the same degree of efficiency as would be possible from a much heavier and cumbersome machine.

What I claim as my invention is:—

1. A potato digger, comprising in combination, a pair of draft beams, a trough-shaped plow carried by the rear ends of the draft beams, a U-shaped element supporting the forward end of the plow and secured to the sides of the draft beams, framing elements extended rearwardly from the U-shaped element, a drum rotatably supported by said framing elements so that its periphery operates behind the rear end of the trough, supporting wheels for the structure and means for rotating the drum.

2. A potato digger, comprising in combination, a pair of draft beams, a trough-shaped plow carried by the rear ends of the draft beams, a U-shaped element supporting the forward end of the plow and secured to the sides of the draft beams, framing elements extended rearwardly from the U-shaped element, a drum rotatably supported by said framing elements so that its periphery operates behind the rear end of the trough, supporting wheels for the structure and means for rotating the drum, said drum having an ellipsoidal formation and the rear end of the plow having a corresponding indentation to receive the periphery of the drum.

3. A potato digger, comprising in combination, a pair of draft beams, a trough-shaped plow carried by the rear ends of the draft beams, a rotary drum mounted behind the trough-shaped plow, said drum having an ellipsoidal formation and the rear end of the plow being correspondingly inturned to receive the drum therein, supporting wheels for the structure, means for rotating the drum, said drum consisting of end hubs, intermediate framing elements and straps secured longitudinally over the framing elements and to the hubs.

In testimony whereof, I affix my signature in the presence of two witnesses.

PAUL BLACK.

Witnesses.
W. L. AYRES,
EDWARD AYRES.

Copies of this patent may be obtained for five cents each, by addressing the "Commissioner of Patents, Washington, D. C."